April 14, 1970 R. F. EWALD 3,506,241
TILT VALVE
Filed July 6, 1967 3 Sheets-Sheet 1
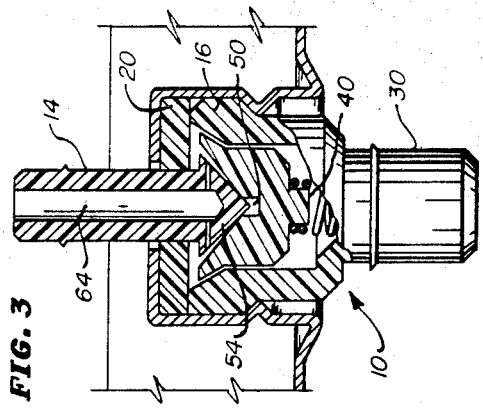
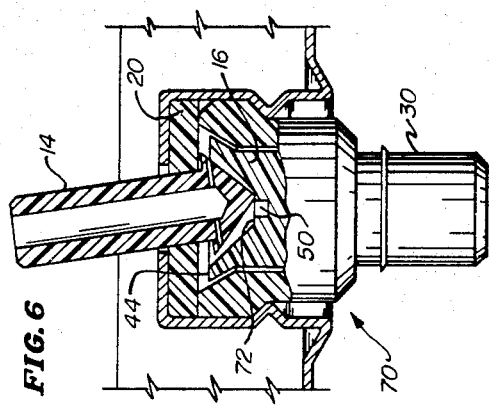
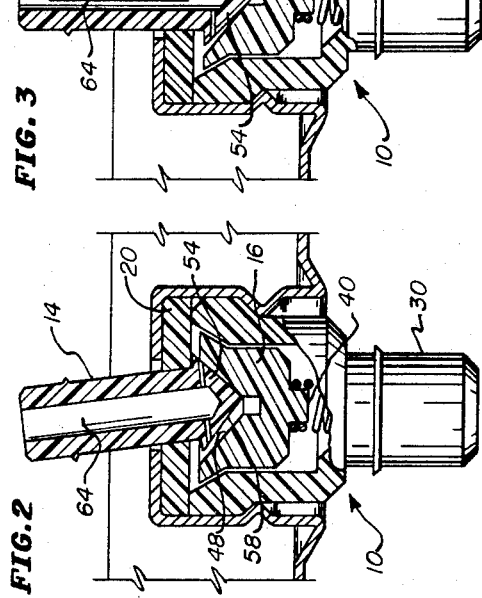
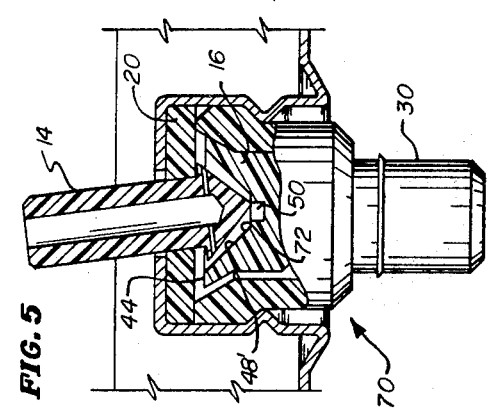
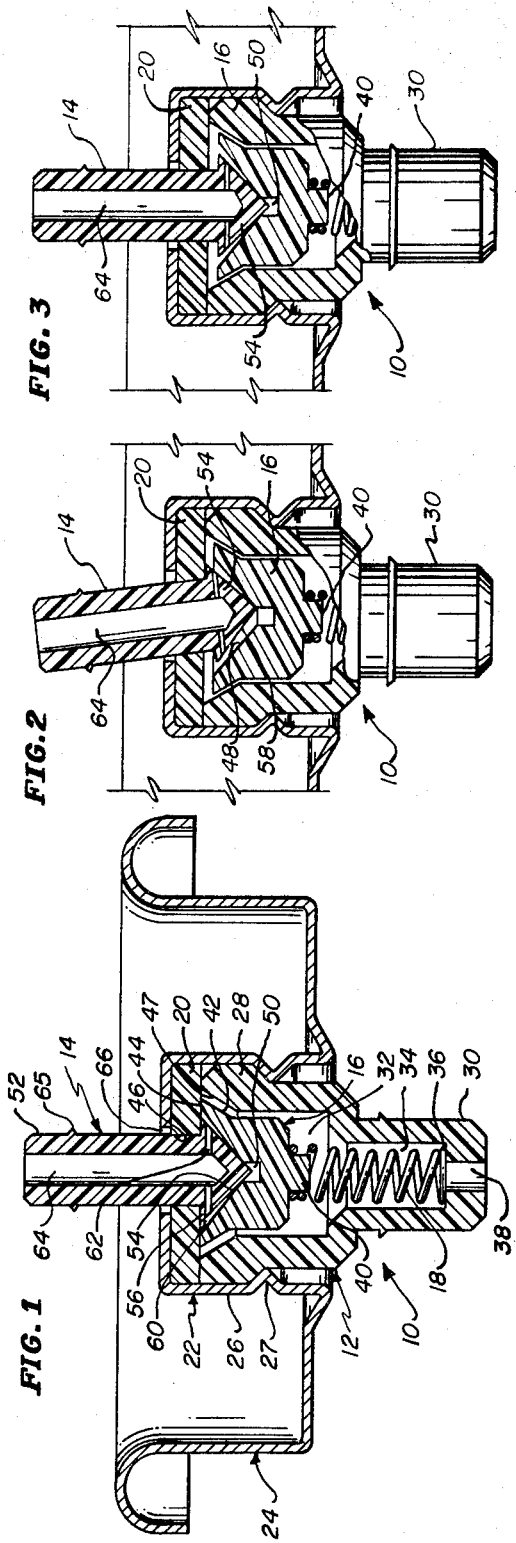
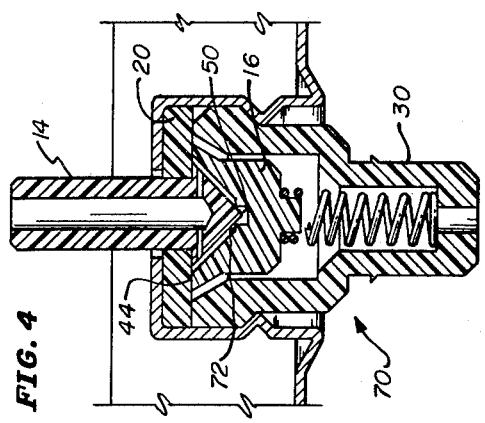
INVENTOR.
RONALD F. EWALD
BY Dominik, Stein & Knechtel
ATTYS.

April 14, 1970  R. F. EWALD  3,506,241
TILT VALVE
Filed July 6, 1967  3 Sheets-Sheet 2
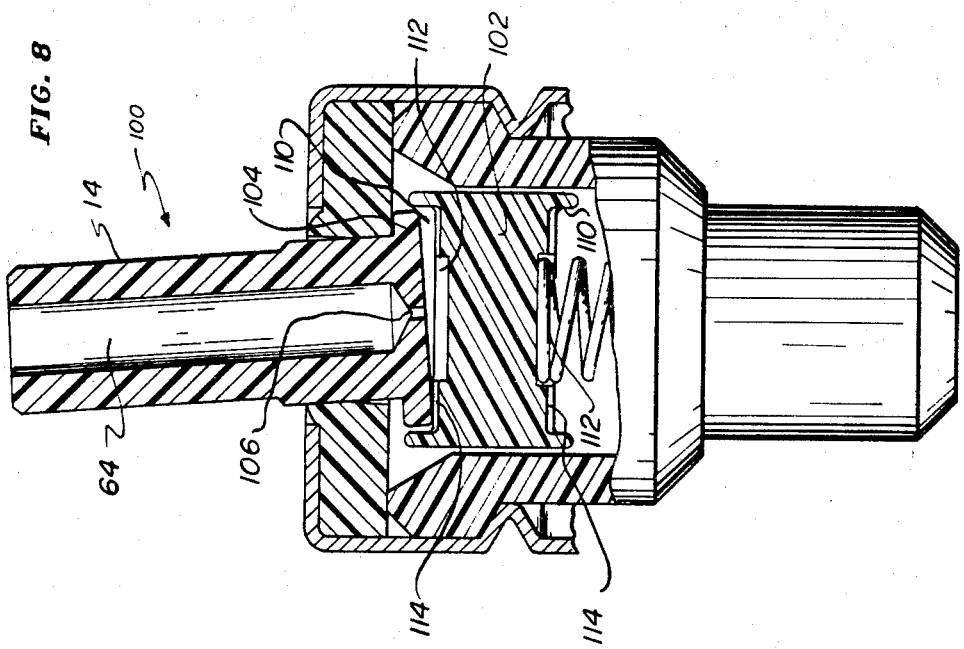
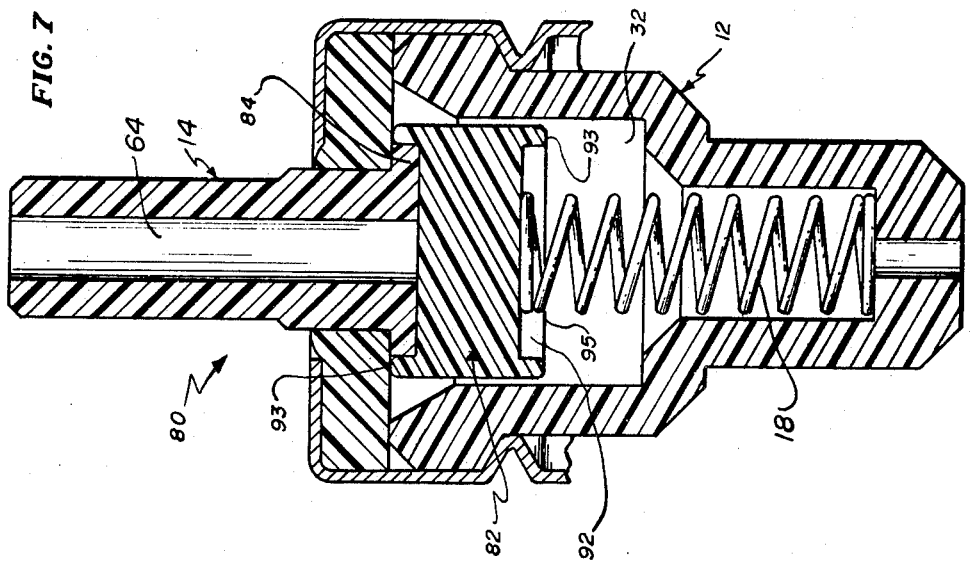
INVENTOR.
RONALD F. EWALD
BY Dominik, Stein & Knechtel
ATTYS.

April 14, 1970 R. F. EWALD 3,506,241
TILT VALVE

Filed July 6, 1967 3 Sheets-Sheet 3

INVENTOR.
RONALD F. EWALD
BY
Dominik, Stein & Knechtel
ATTYS.

United States Patent Office 3,506,241
Patented Apr. 14, 1970

3,506,241
TILT VALVE
Ronald F. Ewald, Rolling Meadows, Ill., assignor to Seaquist Valve Company, Division of Pittsburgh Railways, Cary, Ill., a corporation of Pennsylvania
Filed July 6, 1967, Ser. No. 651,622
Int. Cl. F16k *31/524*
U.S. Cl. 251—354           7 Claims

ABSTRACT OF THE DISCLOSURE

An aerosol valve of the tilt action type, having a valve body, a valve stem, a valve stem sealer, a sealing gasket and valve stem biasing means. The valve stem sealer is reciprocally disposed within the cavity of the valve body and has a valve stem cavity in its top wall which is adapted to receive a specially shaped plug on the inner end of the completely separate valve stem. The peripheral rim of the valve stem sealer is forcibly urged against the sealing gasket, by the valve stem biasing means, to form a seal. The valve stem is operated by tilting and/or depressing it to break this seal to permit the product to be dispensed.

---

This invention relates to valves and, in particular, to aerosol valves of the tilt action type.

Currently, aerosol valves are of two general types: the vertical reciprocating type and the tilt action type. Both are widely used to dispense a variety of products from pressurized containers or cans.

Tilt action valves generally involve a mechanism wherein the protruding valve stem, in its entirety, is tilted to a nonaxial position. Typical patents which illustrate the operating mechanism of such tilt action valves are U.S. Patents 2,506,449; 2,704,172; 2,912,144; 3,155,290; and 3,219,069. As can be seen in these patents, with complete tilting of the valve stem including that portion contained within the valve body, such action occasionally leads to jamming and leakage between the body and the sealing gasket. This is obviously undesirable.

Recently, more sophisticated aerosol valves have been demanded. Fillers demand valves which are tailored to dispense particular products so that the most effective results can be obtained for said products. Thus, aerosol valves have been designed to meter out a specific quantity of product, to mechanically break up the product into a fine spray, to foam the product before it is dispensed and similar effects.

It is an object of this invention to provide an improved aerosol valve of the tilt action type.

Another object is to provide a valve of the above character having a cam action valve stem whereby jamming is avoided.

Still another object is to provide a valve of the above character having a combination swirl-expansion chamber effect.

A further object is to provide a valve of the above character which can be easily and inexpensively manufactured without the need of special equipment and intricate molds.

A still further object is to provide a valve of the above character which can dispense a product intermittently or continuously until empty or until the valve is shut off.

Other objects of the invention will in part be obvious and will in part appear hereinafter.

The aerosol valve of the present invention includes, generally, a valve body adapted to be affixed within the valve turret of a valve housing, a valve stem, a valve stem sealer, a sealing gasket and valve stem biasing means. The valve stem sealer is reciprocally disposed within the cavity of the valve body and has a valve stem cavity in its top wall which is adapted to receive a specially shaped plug on the inner end of the completely separate valve stem. The valve stem biasing means forcibly urges the peripheral rim of the valve stem sealer against the sealing gasket to form a seal.

The valve stem, the valve stem sealer and the cavity within the valve body have a configuration such that a combination swirl-expansion chamber effect is provided for a more satisfactory dispersion of the product.

In operation, the valve stem is tilted, and in some cases depressed, whereby the valve seat on the inner end of the stem cams against the valve stem sealer and causes it to move downwardly into the cavity of the valve body. This action breaks the seal between the rim of the sealer and the sealing gasket, thereby permitting the product to be forced out the valve stem through the action of the propellant within the can.

The invention accordingly comprises the features of construction, combination of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which:

FIG. 1 is a sectional view of an aerosol valve, constructed in accordance with a first embodiment of the invention, illustrating its construction and the manner in which it is assembled;

FIG. 2 is a similar sectional view of the valve of FIG. 1, illustrating the manner in which it operates when the valve stem is tilted;

Figure 9:
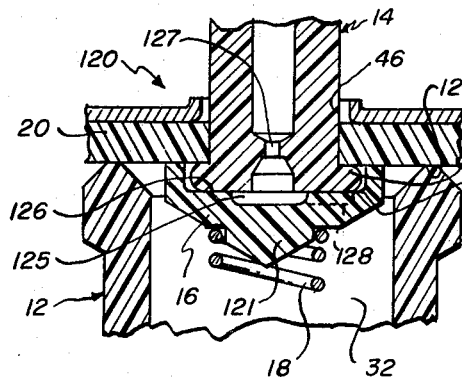
Figure 10:
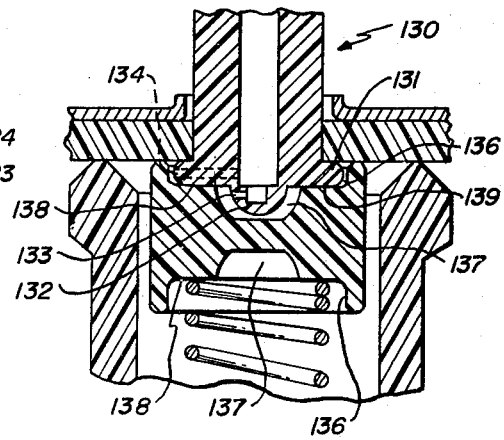
Figure 13:
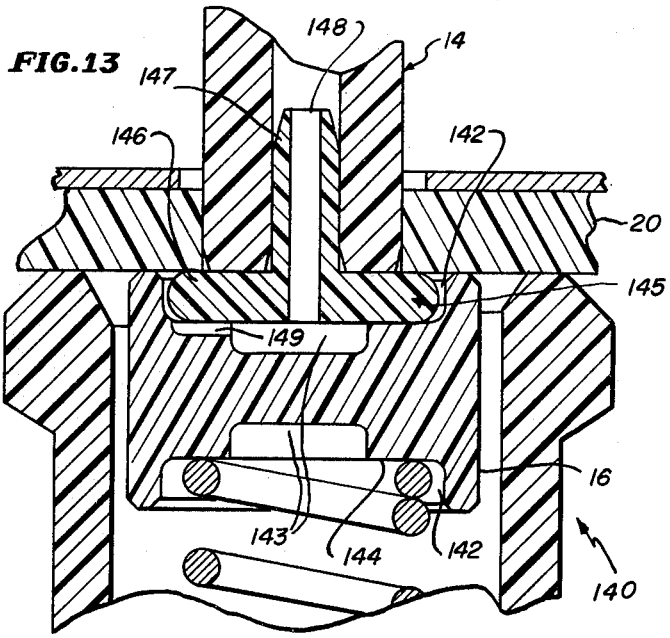
Figure 11:
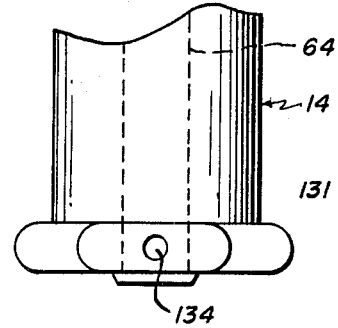
Figure 12:
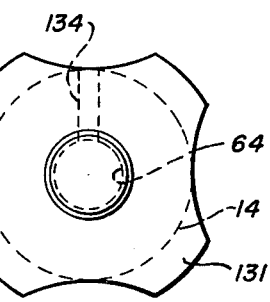

FIG. 3 also is a sectional view of the valve of FIG. 1, illustrating the manner in which it operates when the valve stem is depressed;

FIG. 4 is a sectional view of an aerosol valve constructed in accordance with another embodiment of the invention;

FIG. 5 is a similar sectional view of the valve of FIG. 4, illustrating the manner in which it is operated when the valve stem is tilted;

FIG. 6 also is a sectional view of the valve of FIG. 4, illustrating the manner in which it is releasibly locked in an operative position;

FIG. 7 is a sectional view of an aerosol valve constructed in accordance with still another embodiment of the invention, illustrating it in an inoperative position;

FIG. 8 is a sectional view of a valve like that of FIG. 7 which has been slightly modified, and further illustrating it in an operative position;

FIG. 9 is a partial sectional view of an aerosol valve, illustrating still another construction for the valve stem sealer;

FIG. 10 is a partial sectional view of an aerosol valve, illustrating the manner in which a valve stem having a closed inner end can be used;

FIGS. 11 and 12 are a partial side plan view and a bottom view of the inner end of the valve stem, illustrating the scalloped configuration of the flange thereof; and FIG. 13 is a partial sectional view of still another valve, having a tubular valve stem and a valve stem plug affixed to it.

Similar reference characters refer to similar parts throughout the several views of the drawings.

Referring now to the drawings, in FIGS. 1–3 there is shown an aerosol valve 10 which includes a valve body 12, a valve stem 14, a valve stem sealer 16, valve stem biasing means 18, and a sealing gasket 20. The aerosol valve 10 is adapted to be affixed within a valve turret 22 of a valve housing 24 by, for example, crimping the side wall 26 of the valve turret 22 about the valve body 12, as at 27. The valve housing 24 is adapted to be affixed to an aerosol can, in the well-known manner. The aerosol valve 10 is operated to dispense a product, by depressing and/or tilting the valve stem 14. The valve stem 14 is, in one embodiment of the invention, further adapted to be releasibly locked in an operative position.

More specifically, the valve body 12 of the aerosol valve 10 is of generally tubular construction and has an enlarged diameter head portion 28 and a reduced diameter tail portion 30 which forms a dip tube attachment tail to which a dip tube (not shown) of the type that is generally used can be affixed. A valve stem cavity 32 is formed in the head portion 28 and below it, in the tail portion 30, is formed a cavity 34 for receiving and retaining the valve stem biasing means 18, which may be a spring, as illustrated. The bottom wall of the cavity 34 forms a support surface 36 for the valve stem biasing means, and has an orifice 38 in it through which the product can flow to the valve stem cavity 32.

In the embodiments shown in FIGS. 1 to 6, the valve stem sealer 16 has a reduced diameter portion 40 on its bottom which is engaged by the valve stem biasing means 18, to retain the latter in aligned, operative relationship with the sealer 16. The side wall 42 of the valve stem sealer 16 flares angularly outward near its top, so that its top wall 44 engages against the sealing gasket 20, at a spaced distance about the aperture 46 formed in it. The side wall 47 of the valve stem cavity is correspondingly flared angularly outward near its top, so as to accommodate the valve stem sealer 16. The top wall 44 of the valve stem sealer 16 has a cone-shaped cavity 48 formed in it (FIG. 2), which flows into and joins with a small cylindrical-shaped cavity 50 beneath it. The diameter of the cone-shaped cavity 48, at the top wall 44, is substantially larger than the diameter of the aperture 46 in the sealing gasket 20, for reasons which will be apparent from the description below.

The valve stem 14 has a tubular stem portion 52 which has a cone-shaped inner end 54. The diameter of the inner end 54, at its base, is larger than the diameter of the aperture 46 in the sealing gasket 20, so that the base forms an annular rim 56 which abuts against the sealing gasket 20 to prevent the valve stem 14 from being removed, by pulling it out, once the aerosol valve 10 is assembled. The angle or taper of the side wall 58 (FIG. 2) of the inner end 54 is less than that of the side wall of the cone-shaped cavity 48, so that a space or expansion chamber 60 is provided between these side walls when the tip of the end 54 is engaged within the cylindrical-shaped cavity 50, as illustrated in FIG. 1. Orifice ports 62 are formed in the side wall 58 of end 54 and extend into the cavity 64 of the tubular stem portion 52 of the valve stem. The valve stem portion 52 extends through the aperture 46 in the sealing gasket 20 and the aperture 66 in the top wall of the valve turret 22 a substantial length above the valve turret 22, so that it can be depressed and/or tilted by pushing it with a finger to operate the aerosol valve. A button or actuator of appropriate design, not shown, may be affixed to the valve stem, via anchor tabs 65.

The sealing gasket 20 is an annular-shaped resilient ring, preferably rubber, and the aperture 46 in it is slightly smaller in diameter than that of the stem portion 52 of the valve stem. A tight seal is therefore provided about the stem portion 52 to prevent leakage.

The aperture 66 in the valve turret 22 is preferably of such diameter that the stem portion 52 of the valve stem 14, may be tilted, but only to a limited extent (see FIGS. 5 and 6). Sealing gasket 20 also seals the aperture 66, to prevent leakage.

The valve stem sealer 16 is loosely retained within the valve stem cavity 32, as illustrated, so that the product to be dispensed can flow between the side walls of the sealer and the cavity of the valve body. Alternatively, a tighter, slidable fit can be provided so that the sealer 16 is slidably retained in vertical alignment within cavity 32. In such instance, a number of grooved slots (not shown) are formed in the side wall of either or both, the sealer 16 and the cavity 32, to permit the product to flow past the sealer.

As indicated above, the areosol valve 10 is operated to dispense a product, either by depressing and/or tilting the valve stem 14. When depressing the valve stem 14, a valve button (not shown) is advantageously affixed to the end of the stem portion 52.

The aerosol valve 10 has a cam-type action between the valve stem 14 and the sealer 16. As can be seen in FIG. 2, when the valve stem 14 is tilted to operate the aerosol valve 10, the side wall 58 of the inner end 54, near its tip, cams against the rim of the cavity 50. This camming action forces the sealer 16 to move downwardly within the cavity 32, thereby breaking the seal between its top wall 44 and the sealing gasket 20. The product therefore is now free to flow into the cone-shaped cavity 48 in the sealer 16 and through the orifice ports 62 in the inner end 54 into the cavity of the valve stem 14 from which it is dispensed.

As indicated above, the space between the side walls of the cone-shaped cavity 48 and the inner end 54 function as an expansion chamber 60 for the product. As the product flows into the expansion chamber 60, it is caused to swirl because of the curvature of these side walls and, simultaneously, it is permitted to pre-expand to some degree before being forced through the orifice ports 62 into cavity 64 of the valve stem. Upon passing through the orifice ports 62, the pre-expanded product is partially mechanically broken-up so that product is thereafter more uniformly dispersed.

When the valve stem 14 is released, the valve stem biasing means 18 forcibly urges the sealer 16 upwardly, to effect a seal between its top wall 44 and the sealing gasket 20. The flow of the product is thereby shut off to prevent further dispensing of it.

As can be seen in FIG. 3, when the valve stem 14 is depressed, the inner end 54 of the valve stem cams against the sealer 16 and likewise causes it to be depressed, in the manner described above. When released, the top wall 44 of the sealer 16 seals against the sealing gasket 20, to shut off the flow of product.

In FIGS. 4–6, another aerosol valve 70 is shown which is substantially like the aerosol valve 10, and the like parts thereof are correspondingly numbered. The primary difference between the aerosol valves 10 and 70 is in the shape of the cavity formed in the sealer 16. In the valve 70, a truncated cone-shaped cavity 48 (FIG. 5) is formed in the top wall 44 of the valve stem sealer 16, concentrically about the cylindrical-shaped cavity 50 beneath it. With this construction, an annular shelf 72 is provided above the cavity 50.

The aerosol valve 70 operates in the same manner as the aerosol valve 10, however, when the valve stem 14 is tilted sufficiently, the tip of the inner end 54 will seat on the shelf 72, as illustrated in FIG. 6. The tip will stay seated on the shelf 72, until the valve stem 14 is forcibly urged to disengage it to re-seat in the cylindrical-shaped cavity 50. Accordingly, the aerosol valve 70 can be operated to releasibly lock the valve stem 14 in a position to dispense the product, and it will remain in this position until it is released.

In FIG. 7, there is shown still another aerosol valve 80 which may be operated to dispense a product, by tilting its valve stem. The primary difference in the aerosol valve 80 is in the shape of its valve stem sealer 82 and the inner end 84 of the valve stem 14. The remaining elements of the aerosol valve 80 are like those of the aerosol valves 10 and 70, and are accordingly correspondingly numbered.

The valve stem sealer 82 of the aerosol valve 80 is generally cylindrical-shaped and of a size so as to be reciprocally operable in the valve stem cavity 32 in the valve body 12. As indicated above, the valve stem sealer can be loosely received therein or, alternatively, can be more tightly fitted. In the latter case, groove slots (not shown) are formed in its side walls. Recessed circular-shaped cavities 90 and 92 which are advantageously of the same diameters so that the valve stem sealer 82 can be reversibly placed in the valve stem cavity 32 are formed in the top and bottom walls 94 and 95, respectively, of the valve stem sealer. When assembled, the rim 93 (in the illustrated case) forms a seal with the sealing gasket 20, in the same manner as described above.

The inner end 84 of the valve stem 14 is preferably a circular-shaped, flat plate which has a diameter substantially corresponding to the diameters of the circular-shaped cavities 90 and 92 so that it will seat within them, as illustrated in FIG. 7. The cavity of the stem portion 86 of the valve stem 14, in this case, extends through the inner end 84.

To operate the aerosol valve 80, its valve stem 14 is tilted and this action causes the inner end 84 to cam against the bottom wall of the cavity 90. This action, in turn, causes the valve stem sealer to move downwardly and thereby break the seal between its rim 93 and the sealing gasket 20. The product now is permitted to flow into the recessed cavity 90, and from there out through the cavity of valve stem 14. The annular cavity 98 formed between the walls of the valve stem sealer 82 and the valve stem cavity 32 and the recessed cavity 90 in the valve stem sealer 82 function as a combination of swirling and expansion chamber to mechanically break up and pre-expand the product before it is dispensed, so as to provide a more satisfactory spray.

In FIG. 8, there is illustrated an aerosol valve 100 which is generally like the valve 80, however, the inner end of its valve stem 14 and its valve stem sealer 102 have been modified. With the valve 100, it can be seen that the inner end 104 of the valve stem 14 is closed, except for an orifice 106 extending through it into the cavity 64 within the valve stem.

The valve button sealer 102 has a deep large diameter cavity 110 and a small diameter cavity 112 concentrically formed in each of its two faces. The cavities 110 have diameters substantially corresponding to the diameter of the inner end of the valve stem 14. The cavities 112 have diameters substantially corresponding to the diameter of the valve stem biasing means 18, so as to form both a seat for the valve stem biasing means 18 and a drain chamber, depending upon their positions within the valve stem cavity, as illustrated. The valve 100, as described, is operable by tilting the valve stem 14, however, a number of supply grooves 114 preferably are formed in the bottom wall of the cavities 110, leading into the cavities or drain chambers 112, so that the valve also can be operated by vertically depressing the valve stem 14, as described below.

When the valve stem 14 is tilted and/or depressed, the seal between the top wall of the valve stem sealer 102 and the sealing gasket 20 is broken. This permits the product to flow into the cavity 110, through the supply grooves 114, and into the cavity or drain chamber 112. From the drain chamber 112, it flows through the orifice 106 into the cavity 64 in the valve stem, from which it is dispersed.

In addition to having the features of the valves 10, 70 and 80, the valve 100 has an improved anti-clogging feature, for the product being confined, to some degree, in the supply grooves 114 and the supply chamber 112 has a tendency to "blow" out any dried product or other foreign matter. With this characteristic, it is less subject to clogging.

Referring now to FIGS. 9–11, there are shown three aerosol valves 120, 130 and 140 which are generally similar to the valves 10, 70, 80 and 100, however, each of them is slightly modified, in the manner described below. These valves 120, 130 and 140 each also have a valve body 12, a valve stem 14, a valve stem sealer 16, valve stem biasing means 18, and a sealing gasket 20, and are affixed to an aerosol can, in the above described manner.

In the embodiment shown in FIG. 9, the valve stem sealer 16 has a reduced diameter portion 121 on its bottom which is engaged by the valve stem biasing means 18, to retain the latter in aligned, operative relationship with the sealer 16. The top wall 122 of the valve stem sealer 16 engages against the sealing gasket 20, at a spaced distance about the aperture 46 formed in it, and has a cylindrical-shaped cavity 123 formed in it for receiving and retaining an annular flange 124 integrally formed on the inner end of the valve stem 14. The diameter of the flange 124 is substantially larger than the diameter of the aperture 46 in the sealing gasket 20, to prevent the valve stem 14 from being pulled out of the valve. A smaller diameter cylindrical-shaped drain cavity 125 is formed concentric with and in the bottom wall 126 of the cavity 123.

The valve stem 14 is tubular and has a closed inner end 54 surrounded by the annular flange 124. An orifice port 127 is positioned above the drain cavity 125 and extends into the cavity 64 of the valve stem. Sweep through grooves 128 also are preferably formed in the bottom wall 126 of the cavity 123 extending into the drain cavity 125 so that the valve can be operated by both tilting and vertically depressing the valve stem 14. The valve stem extends through the aperture 46 in the sealing gasket 20 and the aperture 66 in the top wall of the valve turret 22 a substantial length above the valve turret 22, so that it can be depressed and/or tilted by pushing it with a finger to operate the aerosol valve. A button or actuator of appropriate design, not shown, may be affixed to the valve stem.

When the valve stem 14 is tilted to operate the aerosol valve 120, the flange 124 cams against the bottom wall 126 of the cavity 123. This camming action forces the sealer 16 to move downwardly within the cavity 32, thereby breaking the seal between its top wall 122 and the sealing gasket 20. The product therefore is now free to flow into the cavity 123 in the sealer 16, through the sweep-through-grooves 128 into the drain cavity 125 and through the orifice port 127 in the inner end 54 into the cavity of the valve stem 14 from which it is dispensed.

When the valve stem 14 is depressed, the inner end of the valve stem cams against the sealer 16 and likewise causes it to be depressed, in the manner described above. When the valve stem 14 is released, the valve stem biasing means 18 forcibly urges the sealer 16 upwardly, to effect a seal between its top wall 122 and the sealing gasket 20. The flow of the product is thereby shut off to prevent further dispensing of it.

In FIG. 10, the aerosol valve 130 is shown and it can be seen that its valve stem also is tubular and has a closed inner end which is surrounded by an annular flange 131. Beneath the flange 131 there also is a generally semi-circular shaped tip 132 which has an orifice port 133 in it extending into the cavity 64 of the valve stem. Alternatively, or additionally, at least one orifice port 134 can be formed in the flange 131 extending into the cavity 64. Also, the flange 131 can be scalloped, as illustrated in FIGS. 11 and 12, for improved operation when the orifice ports 134 are formed in the flange 131.

The valve stem sealer 16 is generally like the sealer 82 of valve 80 in FIG. 7, in that it has a cavity 136 in each of its two faces for receiving and retaining the flange 131 of the inner end of the valve stem or, alternatively, the biasing means 18. In other words, it is reversible. The sealer 16 also has a deep, smaller drain cavity 137 concentrically formed with and in the bottom wall 138 of the cavity 136, for receiving the tip 132. Sweep-through-grooves 139 also are preferably formed in the bottom wall 138, extending into the drain cavity 137.

The aerosol valve 130 operates in generally the same manner as described above. When the valve stem 14 is tilted or vertically depressed, the seal between the top wall of the valve stem sealer 16 and the sealing gasket 20 is broken, thereby permitting the product to flow into the cavity 136. From the cavity 136, the product flows through the sweep-through-grooves 139 into the drain cavity 137 and through the orifice port 133 into the cavity of the valve stem. The curvature of the drain cavity 137 and of the tip 132 causes the product to swirl about the drain cavity until it finds entrance into the orifice port 133. Also, if an orifice port 134 is formed in the flange 131, some product will flow through it into the cavity of the valve stem.

Upon releasing the valve stem 14, the biasing means 18 forcibly urges the valve stem sealer 16 upward to effect a seal between its top wall and the sealing gasket 20, to cut-off product flow. Any product which remains in the valve stem drains back into the drain cavity 137, and is effectively "blown" out the next time the valve is operated.

In FIG. 13, the aerosol valve 140 is shown and it can be seen that it has a valve stem sealer 16 which is generally cylindrical-shaped with cylindrical-shaped cavities 142 in each of its two faces so that it is reversible. A smaller diameter drain cavity 143 also is formed in the bottom wall 144 of each of the cavities 142, concentric therewith, and sweep through grooves 149 are formed in the bottom wall 144 extending into it. When assembled, the top wall of the valve stem sealer 16 forms a seal with the sealing gasket 20, in the same manner as described above.

The valve stem 14 is a tubular, open ended one having a valve stem plug 145 affixed to its inner end. The plug 145 includes a circular-shaped, flat plate 146 which has a diameter substantially corresponding to the diameters of the cavities 142 so that it will seat within them, as illustrated. Affixed to the plate 146 is a stem portion 147 which is adapted to tightly fit within the open inner end of the valve stem. An orifice port 148 extends through the plate 146 and the stem portion 147. With the plug 145 affixed to the valve stem 14, it can be seen that its inner end is generally of the same configuration as the valve stem of the valve 120. The plug 145, therefore, permits an ordinary, inexpensive tubular valve stem to be used.

To operate the aerosol valve 140, its valve stem 14 is tilted or depressed to cause the valve stem sealer to move downwardly and thereby break the seal between its top wall and the sealing gasket 20. The product now is permitted to flow into the recessed cavity 142, and from there through the sweep-through-grooves 149 into the drain cavity 143. The drain cavity 143 functions as a combination swirling and expansion chamber to mechanically break up and pre-expand the product before it is dispensed, via the orifice port 148 and the cavity in the valve stem, so as to provide a more satisfactory spray.

In each of the above-described aerosol valves, the valve bodies 12 are of the standard type presently used with most aerosol valves. The valve stems 14 and the valve stem sealers all are of simple configurations which can be easily and inexpensively manufactured and assembled without the need of special equipment or intricate molds.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Now that the invention has been described, what is claimed as new and desired to be secured by Letters Patent is:

1. An aerosol valve comprising, in combination: a tubular valve body, a valve stem sealer disposed within the cavity of said valve body, a sealing gasket, biasing means within said valve body normally biasing the upper end of said sealer against said sealing gasket to seal said valve, a tiltable tubular valve stem with its inner end in free-fit contact within a cavity in the top wall of said sealer, said cavity in the top wall of said valve stem sealer comprising a recessed cone-shaped cavity, and said inner end of said valve stem comprising a similar but smaller cone-shaped valve seat closing the end of said tubular valve stem, an expansion chamber formed between the sidewalls of the cone-shaped cavity of the sealer and the side walls of said valve seat, and at least one dispensing port in said cone-shaped valve seat extending into said expansion chamber, and said inner end having a configuration to move relative to and cam against said valve stem sealer to cause said sealer to move away from said inner end and downwardly within said body cavity to break the seal of said valve to thereby permit a product to flow into and through said tubular valve stem.

2. The aerosol valve of claim 1 wherein said cavity in the top wall of said valve stem sealer comprises a truncated cone-shaped cavity and a cylindrical-shaped cavity concentrically disposed beneath it in a fashion such as to form an annular ledge at the juncture between said two cavities whereby said cone-shaped inner end of said valve stem may rest thereon, said valve stem being operable to actuate said aerosol valve to dispense a product by being depressed and tilted, and further adapted to releasibly lock said aerosol valve in said actuate condition when tilted to engage the apex of said cone-shaped inner end on said annular ledge.

3. An aerosol valve comprising, in combination: a tubular valve body, a valve stem sealer disposed within the cavity of said valve body, a sealing gasket, biasing means within said valve body normally biasing the upper end of said sealer against said sealing gasket to seal said valve, a tiltable tubular valve stem with its inner end in free-fit contact with said sealer, said valve stem sealer comprising a cup-shaped member having at least one recessed cavity formed in its top wall and the inner end of said valve stem comprises a flat plate of a dimension which fits within said recessed cavity so as to seat therein, said valve stem sealer further including a drain cavity in the bottom wall of said recessed cavity disposed beneath the inner end of said valve stem, the cavity of said valve stem extending through said plate and the edges of said plate acting to cam said valve stem sealer downwardly to break the seal between it and said sealing gasket when said valve stem is tilted.

4. The aerosol valve of claim 3 wherein said valve stem sealer further includes at least one sweep through groove in the bottom wall of said recessed cavity extending into said drain cavity.

5. The aerosol valve of claim 3 wherein said valve stem sealer has a base to base cup-shaped member and includes a recessed cavity and a drain cavity in both its top and bottom walls, so that said valve stem sealer is reversible in said cavity of said valve body.

6. The aerosol valve of claim 5 wherein said drain cavities in said valve stem sealer are of a diameter to receive and retain the end of said biasing means therein.

7. An aerosol valve comprising, in combination: a tubular valve body, a valve stem sealer disposed within the cavity of said valve body, a sealing gasket, biasing means within said valve body normally biasing the upper end of said sealer against said sealing gasket to seal said valve, a tiltable tubular valve stem with its inner end in free-fit contact with said sealer, a valve stem plug including a flat plate and an upstanding tip of a dimension to tightly fit within the open inner end of said valve stem, an orifice port extending through said flat plate and said tip, said valve stem sealer comprising a base-to-base cup-shaped member having at least one recessed cavity formed in its top wall which is of a diameter to receive said flat plate therein, said inner end having a configuration to move relative to and cam against said valve stem sealer to cause said sealer to move away from said inner end and downwardly within said body cavity to break the seal of said valve to thereby permit a product to flow into and through said tubular valve stem.

References Cited
UNITED STATES PATENTS

| | | | |
|---|---|---|---|
| 2,913,154 | 11/1959 | Kuffer | 251—353 XR |
| 3,060,965 | 10/1962 | Taggart | 222—402.22 XR |
| 3,098,589 | 7/1963 | Graham | 251—353 XR |
| 3,145,011 | 8/1964 | Kappel | 251—353 XR |
| 3,219,069 | 11/1965 | Kuffer | 222—402.22 XR |
| 3,231,153 | 1/1966 | Green et al. | 251—353 XR |

SAMUEL SCOTT, Primary Examiner

U.S. Cl. X.R.

222—402.21